No. 845,231. PATENTED FEB. 26, 1907.
L. P. GRAHAM.
CORN SORTER.
APPLICATION FILED APR. 3, 1906.

Witnesses.
Ina C. Graham.
Ivy Scherer.

Inventor.
Levi P. Graham

UNITED STATES PATENT OFFICE.

LEVI P. GRAHAM, OF DECATUR, ILLINOIS.

CORN-SORTER.

No. 845,231.  Specification of Letters Patent.  Patented Feb. 26, 1907.

Application filed April 3, 1906. Serial No. 309,654.

*To all whom it may concern:*

Be it known that I, LEVI P. GRAHAM, a resident of the city of Decatur, county of Macon, and State of Illinois, have invented certain new and useful Improvements in Corn-Sorters, of which the following is a specification.

This invention has particular reference to means for sorting seed-corn preparatory to planting; and the object of the invention is to separate the butts or large round grains by edgewise selection preparatory to submitting the thinner grains to flatwise sorting on a screen. The gist of the idea is to lift the butts out of the sorting-slot through which the thinner grains have passed and to discharge the butts clear of the screen.

Figure 1:
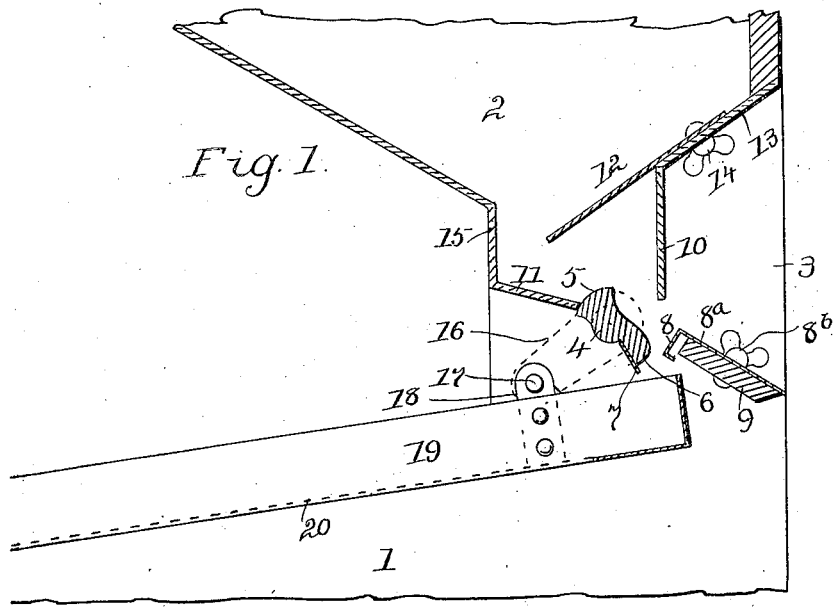
Figure 2:
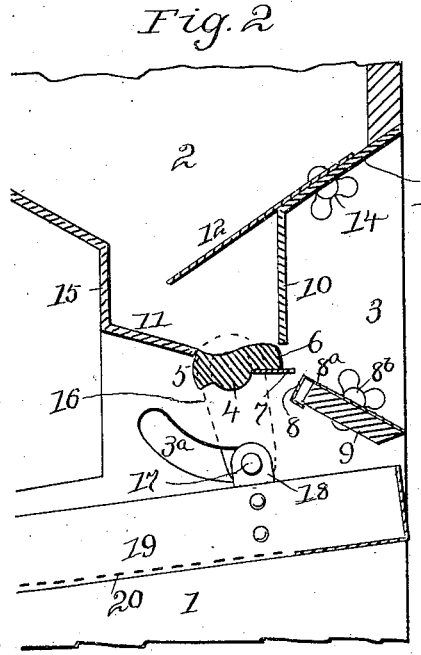
Figure 3:
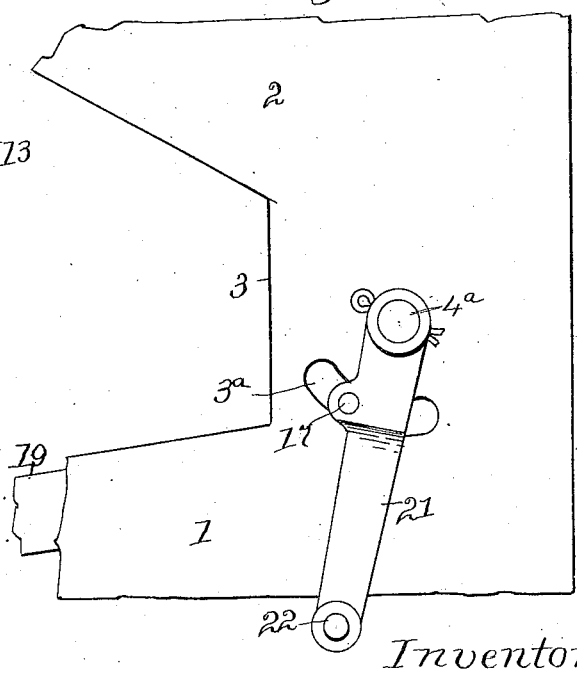

In the drawings forming part of this specification, Figure 1 is a vertical section crosswise of the operative parts of a sorter embodying my invention, showing the parts in position to feed a batch of corn to the sorting-slot. Fig. 2 is a similar section showing the parts in position to discharge the butts retained in the slot. Fig. 3 is a side elevation of a fragment of the sorter, showing the crank-arm by means of which the sorting-shaft is rocked and the screen reciprocated.

A fragment of the body of the sorter is shown at 1. A part of the hopper is shown at 2, and at 3 is shown the throat of the machine, in which the sorting-slot is located.

A rock-bar 4 is shaped to receive corn on its upper surface, and it has trunnions 4ª, one of which is shown in Fig. 3. The rear edge 5 of the rock-bar is arc-formed. The front edge or nose of the rock-bar is preferably rounded, and a butt-lifting ledge 7 projects below the front edge or nose of the bar.

An oblique wall 8 coacts with the nose 6 of the rock-bar to form a sorting-slot when the nose is in the position shown in Fig. 1, and the forward and downward inclined chute-plate 8ª is preferably a continuation of the sheet-metal plate of which wall 8 is formed. A cross-strip 9 forms a support for the wall 8 and chute-plate 8ª, and set-screws 8ᵇ secure the chute-plate to the cross-strip in a manner permitting proper adjustment of wall 8.

The hopper is preferably provided with the vertical wall 15 in the rear of and above the rock-bar, and a feed-shelf 11 extends from wall 15 to the arc-formed edge 5 of the rock-bar. An inclined plate 13 above and in front of the rock-bar sustains the plate 12, and the plate 12 is used to limit the flow of corn down shelf 11 to the rock-plate. Set-screws 14 secure the plate 12 to the plate 13 and provide means for holding the plate 12 in position to properly restrict flow of corn from the hopper. A plate 10 may extend downward to the nose of the rock-bar in order to absolutely preclude passage of corn over the rock-bar while the bar is in a corn-receiving position.

An arm 16 (shown in dotted lines in Figs. 1 and 2) and the arm 21 (shown in Fig. 3) are fastened one to each trunnion 4ª of the rock-bar, and each has a pin 17, which extends through a slot 3ª of the throat and engages a lug 18 on screen-frame 19. The screen-frame is provided with a screen 20, suitable for separating small grains, trash, &c., from the plantable grains that pass over the tail of the screen. A handle 22 on arm 21 provides means for rocking the sorting-bar and reciprocating the screen.

While the rock-bar is in the position shown in Fig. 2 it will receive a batch of corn from shelf 11, and when it is rocked to the position shown in Fig. 1 it will deliver the batch to the slot formed by nose 6 and wall 8. The thinner grains are free to fall througn the slot, but the butts or undesirably thick grains will be temporarily retained, and when the rock-bar is returned to the position shown in Fig. 2 the ledge 7 will travel up the inclined wall 8 and throw the butts onto the chute-plate 8ª to be discharged thereby clear of the screen.

The receiving end of the screen moves back and forth under the chute-plate 8ª, and the movement of the screen may be timed and extended as desired without danger of the butts getting onto the screen with the grains, from which they have been separated by the sorting-slot.

I claim—

1. In a corn-sorter, the combination of a stationary wall, a rocking member forming with the wall a sorting-slot, and a ledge on the rocking member adapted to lift out of the sorting-slot the grains detained therein.

2. In a corn-sorter, the combination of a stationary wall, a rocking member forming with the wall a sorting-slot, a screen having its receiving end beneath the sorting-slot, a ledge on the rocking member adapted to lift out of the slot the grains detained therein, and a chute conjoined with the stationary member and extended beyond the screen.

3. In a corn-sorter, the combination of separated surfaces forming a sorting-slot having converging walls, means for supplying batches of corn to the slot at intervals, and means, operative between batch-supplying movements only, for lifting out of the slot grains detained therein.

4. In a corn-sorter, the combination of separated surfaces forming a sorting-slot having converging walls, a screen having its receiving end located beneath the slot, means for supplying batches of corn to the slot at intervals, and means, substantially as described, for lifting out of the slot grains detained therein and discharging them clear of the screen.

5. In a corn-sorter, the combination of an oblique wall, a rock-bar adapted to hold corn on its upper surface, a nose of the rock-bar forming with the oblique wall a sorting-slot when the bar is rocked to discharge the corn off its upper surface, and a ledge on the nose below the slot when the nose is lowered; said ledge being adapted to lift out of the slot and over the oblique wall the grains detained in the slot.

In testimony whereof I sign my name in the presence of two subscribing witnesses.

LEVI P. GRAHAM.

Witnesses:
NORA GRAHAM,
INA C. GRAHAM.